(12) United States Patent
Zink (10) Patent No.: US 11,344,024 B2
(45) Date of Patent: May 31, 2022

(54) SPINNING WING DECOY AND WINGS FOR DECOY

(71) Applicant: Plano Molding Company, LLC, Plano, IL (US)

(72) Inventor: Fred Zink, Clinton, OH (US)

(73) Assignee: GOOD SPORTSMAN MARKETING, L.L.C., Irving, TX (US)

( * ) Notice: Subject to any disclaimer, the term of this patent is extended or adjusted under 35 U.S.C. 154(b) by 919 days.

(21) Appl. No.: 15/636,995

(22) Filed: Jun. 29, 2017

(65) Prior Publication Data
US 2019/0000069 A1    Jan. 3, 2019

(51) Int. Cl.
*A01M 31/06*    (2006.01)

(52) U.S. Cl.
CPC .................................. *A01M 31/06* (2013.01)

(58) Field of Classification Search
CPC .................................................... A01M 31/06
See application file for complete search history.

(56) References Cited

U.S. PATENT DOCUMENTS

| | | | |
|---|---|---|---|
| 636,106 A | 10/1899 | Biddle | |
| 843,588 A | 2/1907 | Ditto | |
| 2,545,801 A * | 3/1951 | Wrazen | A63H 33/40 40/412 |
| 3,869,823 A * | 3/1975 | Powers | A01M 31/06 43/3 |
| 4,620,385 A | 11/1986 | Carranza et al. | |
| 4,896,448 A * | 1/1990 | Jackson | A01M 31/06 43/3 |
| 5,809,683 A * | 9/1998 | Solomon | A01M 31/06 43/3 |
| 5,930,936 A | 8/1999 | Parr et al. | |
| 6,092,323 A * | 7/2000 | McBride | A01M 31/06 43/3 |
| 6,170,188 B1 * | 1/2001 | Mathews | A01M 31/06 43/3 |
| 6,227,483 B1 * | 5/2001 | Therriault | B64C 33/02 244/20 |
| 6,293,042 B1 * | 9/2001 | Arvanitis, Jr. | A01M 31/06 43/3 |
| 6,339,894 B1 * | 1/2002 | Solomon | A01M 31/06 43/3 |
| 6,408,559 B2 | 6/2002 | Mathews | |
| 6,460,284 B1 * | 10/2002 | Rabo | A01M 31/06 43/17.5 |

(Continued)

FOREIGN PATENT DOCUMENTS

GB    2295953 A    6/1996

*Primary Examiner* — Michael H Wang
(74) *Attorney, Agent, or Firm* — Ice Miller LLP (57) ABSTRACT

A decoy comprises a wing system that includes a drive system and at least one wing that is operable to create realistic movement of the at least one wing, thereby simulating actual motion of a fowl wing. The wing system comprises at least one wing that may look like the top of a bird wing and bottom of a bird wing, respectively. During operation, the at least one wing would look natural and realistic, accurately mimicking a real flapping wing. The at least one wing may be configured to oscillate repeatedly back and forth. The at least one wing may be configured to flap. The at least one wing may be configured to oscillate repeatedly back and forth and flap simultaneously.

20 Claims, 6 Drawing Sheets

(56) References Cited

U.S. PATENT DOCUMENTS

| | | | |
|---|---|---|---|
| 6,493,980 B1 * | 12/2002 | Richardson | A01M 31/06 43/3 |
| D469,152 S | 1/2003 | Mathews | |
| 6,508,028 B1 * | 1/2003 | Crowe | A01M 31/06 43/3 |
| 6,698,132 B1 * | 3/2004 | Brint | A01M 31/06 43/2 |
| 7,607,610 B1 * | 10/2009 | Sterchak | B64C 33/02 244/11 |
| 8,181,907 B2 * | 5/2012 | Smith | B64C 33/02 244/72 |
| 9,101,129 B2 * | 8/2015 | Brooks | A01M 31/06 |
| 2002/0069572 A1 * | 6/2002 | Price, Sr. | A01M 31/06 43/3 |
| 2002/0152666 A1 * | 10/2002 | Solomon | A01M 31/06 43/3 |
| 2004/0107623 A1 * | 6/2004 | Brint | A01M 31/06 43/2 |
| 2004/0211106 A1 * | 10/2004 | Solomon | A01M 31/06 43/3 |
| 2005/0138855 A1 * | 6/2005 | Jensen | A01M 31/06 43/3 |
| 2007/0006514 A1 * | 1/2007 | Fiore | A01M 31/06 43/2 |
| 2009/0241401 A1 * | 10/2009 | Price | A01M 31/06 43/3 |
| 2011/0088307 A1 * | 4/2011 | Rice | A01M 31/06 43/3 |
| 2012/0227306 A1 * | 9/2012 | Fong | A01M 31/06 43/3 |
| 2013/0239454 A1 * | 9/2013 | Szechenyi | F16H 21/44 43/3 |
| 2016/0212985 A1 * | 7/2016 | Bullington | A01M 31/06 |
| 2017/0027160 A1 * | 2/2017 | Latschaw | A01M 31/06 |
| 2017/0042138 A1 * | 2/2017 | Oshgan | A01M 31/06 |
| 2017/0332620 A1 * | 11/2017 | Noe | A01M 31/06 |
| 2018/0192638 A1 * | 7/2018 | Denmon | A01M 31/06 |

* cited by examiner

SPINNING WING DECOY AND WINGS FOR DECOY

FIELD OF THE DISCLOSURE

The disclosure relates generally to motion decoys to attract fowl (such as, for example, ducks, geese, turkey, doves, etc.) closer to an individual hunting, videoing, or photographing.

BACKGROUND OF THE DISCLOSURE

Current motion decoys have become common and their simplicity lacks realistic detail. Moreover, they have become learned and somewhat ineffective to wildfowl. The current motion of decoy wings is to rotate continuously 360 degrees in one direction. The change in color of the wings (one side white, one side colored) as they rotate creates a "flash" that attracts birds at a far distance. This flash, however, tends to become less and less effective to lure them into good shooting, videoing, or photography range as they get closer and closer to the decoy.

Figure 6:
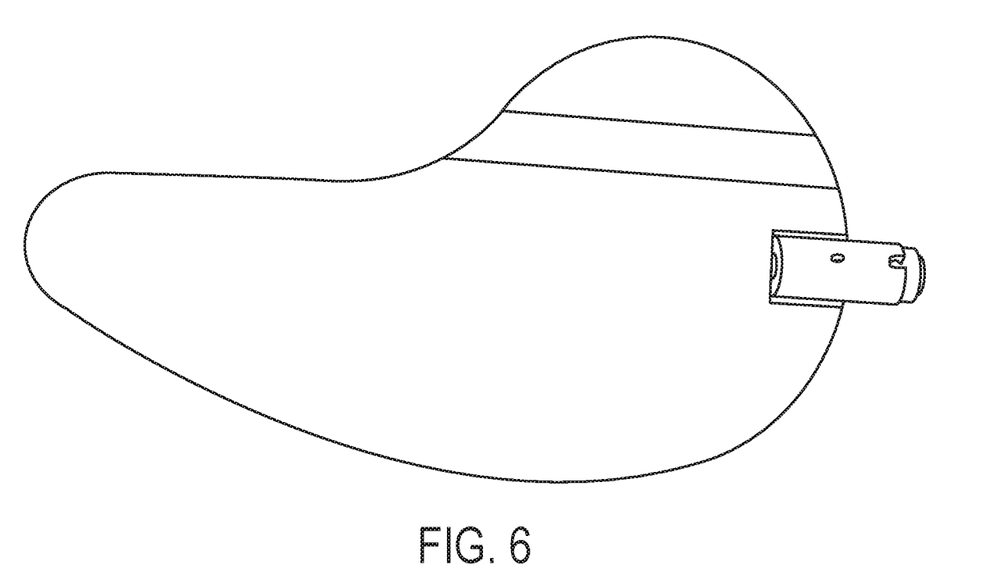
FIGS. 6 and 7 show top and bottom sides, respectively, of a known wing.
Figure 7:
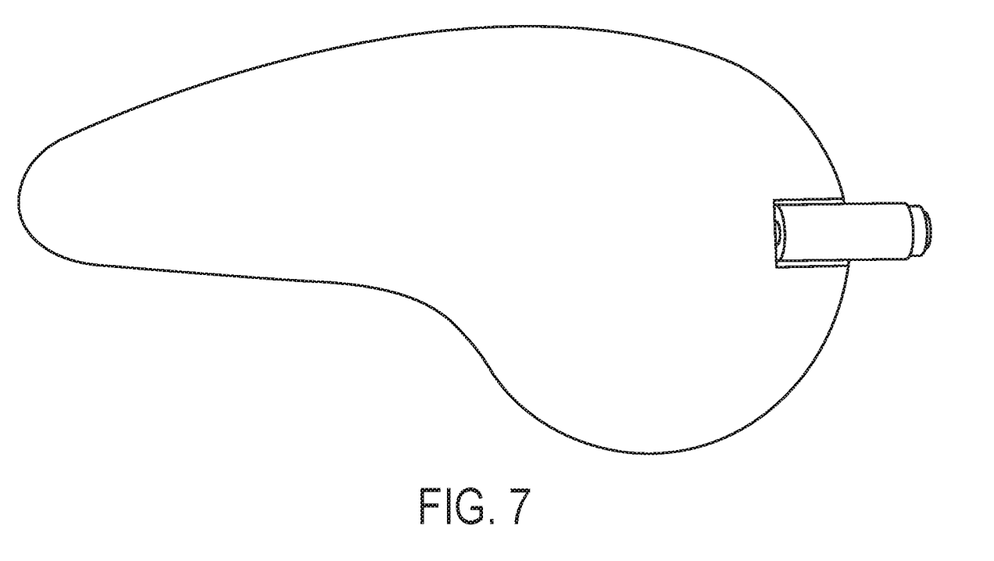

FIGS. 6 and 7 show top and bottom sides, respectively, of a known wing that is used with current motion decoys.

A significant drawback with current decoys is their presentation, including the presentation of the wings used with the decoys. Although attractive, current decoys are not realistic and fowl have caught on to them. The present disclosure addresses and resolves the drawbacks of current decoys by providing realism to both the wings and their relative motion.

SUMMARY OF THE DISCLOSURE

According to an embodiment of the disclosure, a wing system for a decoy comprises a drive system and a pair of wings that are operable to create realistic movement of the wings, thereby simulating actual motion of fowl wings. The drive system may comprise a motor and a motor shaft. The wings may each include a wing body and a wing shaft.

The wing body may have any shape that creates a realistic illusion of wing motion, including the non-limiting shapes disclosed herein. The wing body may be painted or formed with various colors, patterns, or shapes to create a realistic look when the wing is in motion.

The wing shaft may be configured to easily connect and disconnect to the motor shaft. The wing shaft may have a coupling mechanism (not shown), so as to facilitate quick and easy coupling between the wing shaft and the motor shaft.

According to an embodiment of the disclosure, a decoy comprises a wing system that includes the drive system and at least one wing that is operable to create realistic movement of the at least one wing, thereby simulating actual motion of a fowl wing.

The wing system comprises at least one wing that may look like the top of a bird wing and bottom of a bird wing, respectively. During operation, the at least one wing would look natural and realistic, accurately mimicking a real flapping wing. The at least one wing may be configured to oscillate repeatedly back and forth. The at least one wing may be configured to flutter or flap. The at least one wing may be configured to oscillate repeatedly back and forth and flutter (or flap) simultaneously.

The drive system may drive the wing to oscillate repeatedly back and forth, such as up to, for example, about 180 degrees. This provides a realistic motion. Using wing designs such as those disclosed herein, the oscillation of the wings may be varied by the drive system to show, for example, a white (or partially white) side and a color side for long distance flash attraction, then change when a bird gets closer to show only the color side to mimic what a bird would see when closer to the decoy.

The drive system may be operated manually or automatically.

The drive system may drive the wing to oscillate between, for example, 0 degrees and about 180 to about 360 degrees, or to rotate 360 degrees for long range flash, then rotate the wing so that it oscillates, for example, the top or colored side only to mimic what a bird would see when closer to the decoy. The white (or light) side of the wing may be employed for flash and attraction and natural color may be employed for getting fowl close.

According to the principles of the disclosure, the decoy may be configured with realistic wing shape and realistic painting detail. The painting detailed on the shape may show a realistic wing, and the shape may be optimized for rotational movement balance. The angle of the rotation of the wings relative to the centerline of the decoy may be adjustable. The drive system may be configured to rotate, oscillate, and/or flap the wings. During oscillation, the wings may be partially rotated (about the shaft axis) back and forth, thereby providing an oscillation of the wings.

Additional features, advantages, and embodiments of the disclosure may be set forth or apparent from consideration of the detailed description and drawings. Moreover, it is to be understood that the foregoing summary of the disclosure and the following detailed description and drawings are exemplary and intended to provide further explanation without limiting the scope of the disclosure.

BRIEF DESCRIPTION OF THE DRAWINGS

The accompanying drawings, which are included to provide a further understanding of the disclosure, are incorporated in and constitute a part of this specification, illustrate embodiments of the disclosure and together with the detailed description serve to explain the principles of the disclosure. No attempt is made to show structural details of the disclosure in more detail than may be necessary for a fundamental understanding of the disclosure and the various ways in which it may be practiced.

The present disclosure is further described in the detailed description and drawings that follow.

DETAILED DESCRIPTION OF THE DISCLOSURE

The embodiments of the disclosure and the various features and advantageous details thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the disclosure. The examples used herein are intended merely to facilitate an understanding of ways in which the disclosure may be practiced and to further enable those of skill in the art to practice the embodiments of the disclosure. Accordingly, the examples and embodiments herein should not be construed as limiting the scope of the disclosure, which is defined solely by the appended claims and applicable law. Moreover, it is noted that like reference numerals represent similar parts throughout the several views of the drawings.

Figure 1:
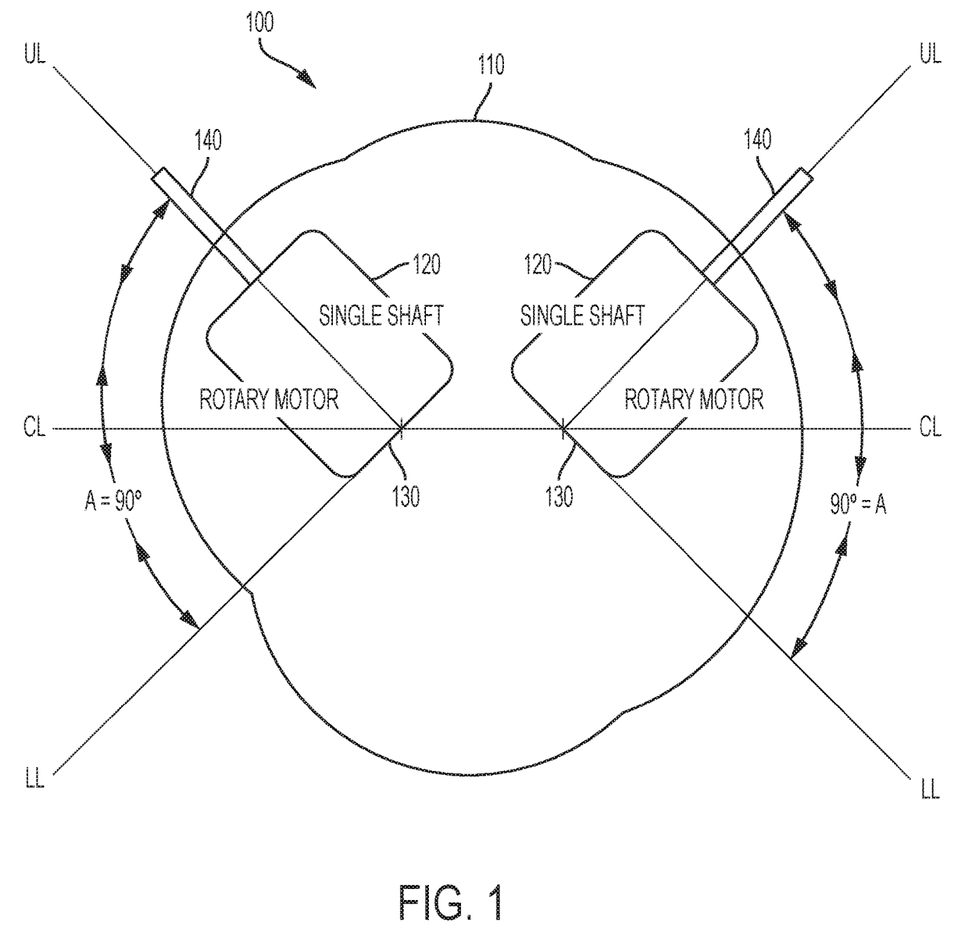
FIG. 1 shows an example of a decoy comprising a drive system, constructed according to the principles of the disclosure.

FIG. 1 shows an example of a decoy 100 comprising a decoy body 110 and a drive system 120, constructed according to the principles of the disclosure. The drive system 120 may be coupled to one or both of a pair of wings (e.g., wings 200 shown in FIGS. 2 and 3, or wings 300 shown in FIGS. 4 and 5, or the like) and operated to create realistic movement of the wings 200 (or 300), thereby simulating actual motion of fowl wings. The drive system 120 may comprise a motor 130 (e.g., a rotary motor) and a motor shaft 140. One end of the motor shaft 140 may be connected to the motor 130 and the other end may be configured to connect to a wing.

The drive system 120 may comprise a motion sensor (not shown) and/or a proximity sensor (not shown). The drive system 120 may comprise a controller (not shown) that may be communicatively coupled to the motion sensor and/or proximity sensor. The controller may control the motor 130 based on the signal(s) received from the motion sensor and/or proximity sensor, so as to vary the degree of oscillation (e.g., 0° to 180° partial rotation, 360° rotation, or some other angle of oscillation between 0° and) 360°, rate of oscillation, rate of rotation of the wing(s), degree of flapping (e.g., angle A=between 0° and 90°, or angle A=between 0° and some other angle greater or less than) 90°, rate of flapping. The drive system 120 may include one or more actuators (not shown), including, for example, a motor (not shown), to drive the wings to flap. The controller may be coupled to the one or more actuators to automatically control flapping of the wings. The actuator (not shown) may be adjustable, so as allow for adjustment of the flap angle A between a flap angle upper limit UL and a flap angle lower limit LL, which is set to 90° in FIG. 1, but may be less than, or greater than 90°. The flap angle A may be fixed.

As seen in FIG. 1, the drive system 120 may comprise a pair of motors 130 (e.g., rotary motors) and a pair of respective motor shafts 140. The drive system 120 may drive each wing 200 (or 300) to oscillate repeatedly back and forth, such as up to, for example, about 180 degrees. This provides a realistic motion. Using wing designs such as, for example, the wings 200 shown in FIGS. 2 and 3, the oscillation of the wings may be varied to show, for example, a white side 200L1, 200L2 (shown in FIG. 3) and a color side 200U1, 200U2 (shown in FIG. 2) for long distance flash attraction, then changed when, for example, a bird gets closer to show only the color side 200U1, 200U2 (shown in FIG. 2) to mimic what a bird would see when closer to the decoy.

The drive system 120 may drive the wing 200 (or 300) to oscillate between, for example, 0 degrees and about 180 to about 360 degrees, or to rotate 360 degrees continuously for long range flash, then partially rotate the wing 200 back-and-forth, so that the wing oscillates, for example, the top or colored side 200U1 and 200U2 (shown in FIG. 2) only to mimic what a bird would see when closer to the decoy 100. Other angles of oscillation are contemplated, including angles less than 180 degrees, or greater than 360 degrees. During operation, the white side 200L1 and 200L2 (shown in FIG. 2) of the wing 200 may be shown for flash and attraction and the natural color side 200U1 and 200U2 (shown in FIG. 3) may be shown for getting fowl close.

Alternatively, the drive system 120 may comprise a gear box (not shown) that may be connected to a pair of rotatable shafts (not shown), similar to the shafts 140 shown in FIG. 1. The gear box may include, for example, a worm gear, a spur gear, a helical gear, a bevel gear, a spiral bevel gear, a hypoid gear, or the like. The rotatable shaft(s) may have a gear at one end that mates with and engages with one or more gears in the gear box to rotate 360 degrees, or oscillate less than 360 degrees (e.g., 180 degrees, or less), thereby oscillating the rotatable shaft(s) back and forth. The gear box may be configured to drive the shaft(s). At the other end of the rotatable shaft(s), the shaft(s) may have a coupling mechanism (not shown) that connects to a wing, such as, for example, wing 200 (shown in FIGS. 2 and 3). The gear box may be configured to rotate (or oscillate) the shaft(s). The gear box may be configured to pivot the shaft(s) with respect to the center line CL (shown in FIG. 1), thereby causing the wing (when attached to the shaft) to flap.

The drive system 120 may be configured for automated operation, or manual operation.

Figure 2:
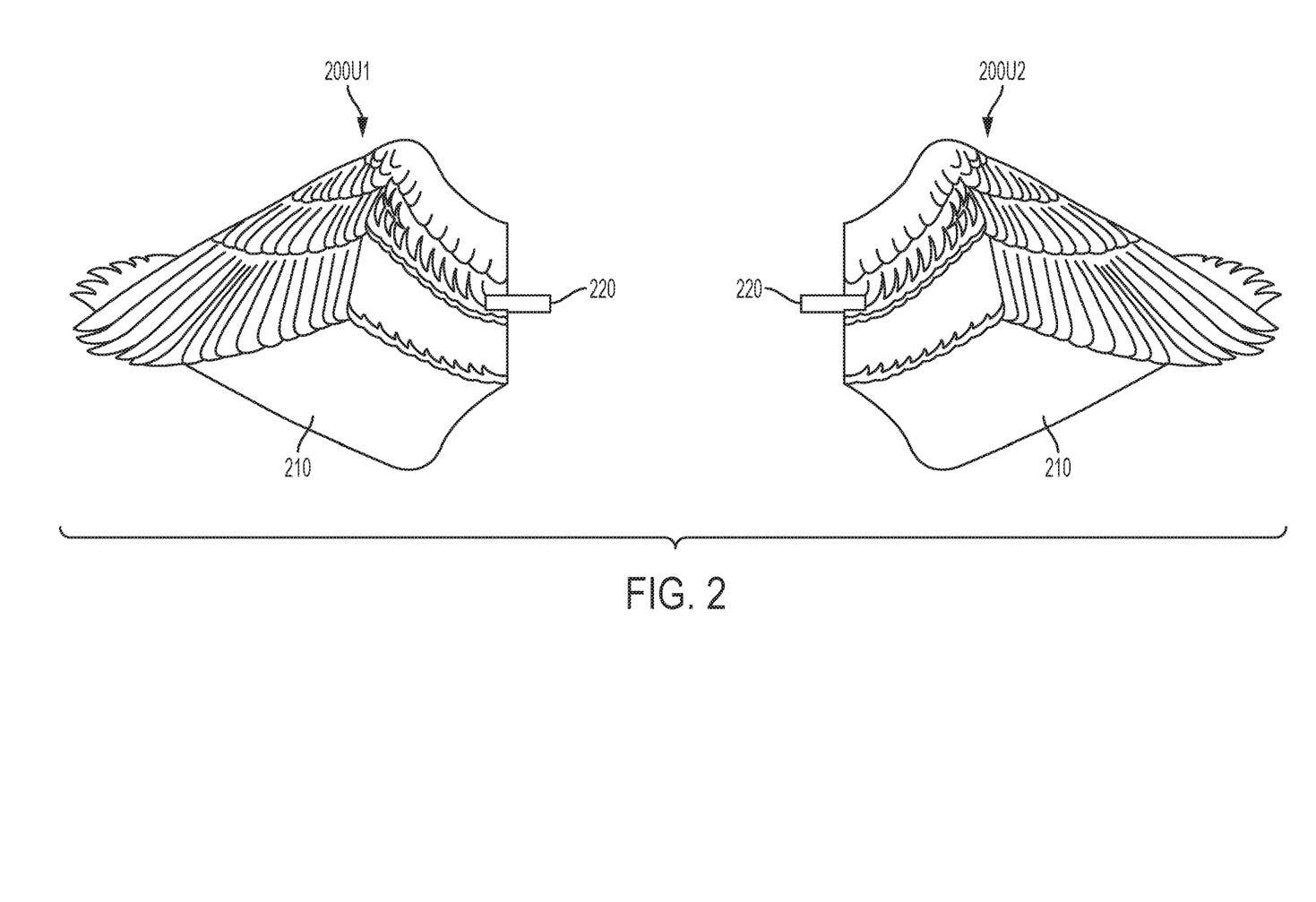
FIG. 2 shows a first (or top) side of an example of a left wing and a right wing, constructed according to the principles of the disclosure.

FIG. 2 shows a first (e.g., top) side of an example of a first (e.g., left) wing 200U1 and a second (e.g., right) wing 200U2, constructed according to the principles of the disclosure. The wings 200 may each include a wing body 210 and a wing shaft 220. The wing body 210 may have any shape that creates a realistic illusion of wing motion, including the non-limiting shapes disclosed herein. The wing body 210 may be painted or formed with various colors, patterns, or shapes. The colors, patterns, or shapes may be selected for maximum effect, so as to attract predetermined birds to the decoy 100 (shown in FIG. 1). As seen in FIG. 2, wings 200U1 and 200U2 may be painted with a brown upper portion, a blue middle portion, and a dark or black bottom portion, with white areas separating the blue middle portion from the brown upper portion and dark bottom portion, thereby providing optimal attraction for a predetermined bird, such as, for example, certain water-fowl.

The wing shaft 220 may be configured to easily connect (or disconnect) to the motor shaft 140 (shown in FIG. 1). The wing shaft 220 may have a coupling mechanism (not shown), so as to facilitate quick and easy coupling between the wing shaft 220 and the motor shaft 140, thereby allowing for easy replacement of wings 200 (or 300), for removal of wings 200 for more compact storage, and the like. The coupling mechanism may be configured to rigidly affix the wing shaft 220 to the motor shaft 140. During operation, the wing 200 may be drive by the wing shaft 220 to create realistic movement of the wing 200, thereby simulating actual motion of a fowl wing.

Figure 3:
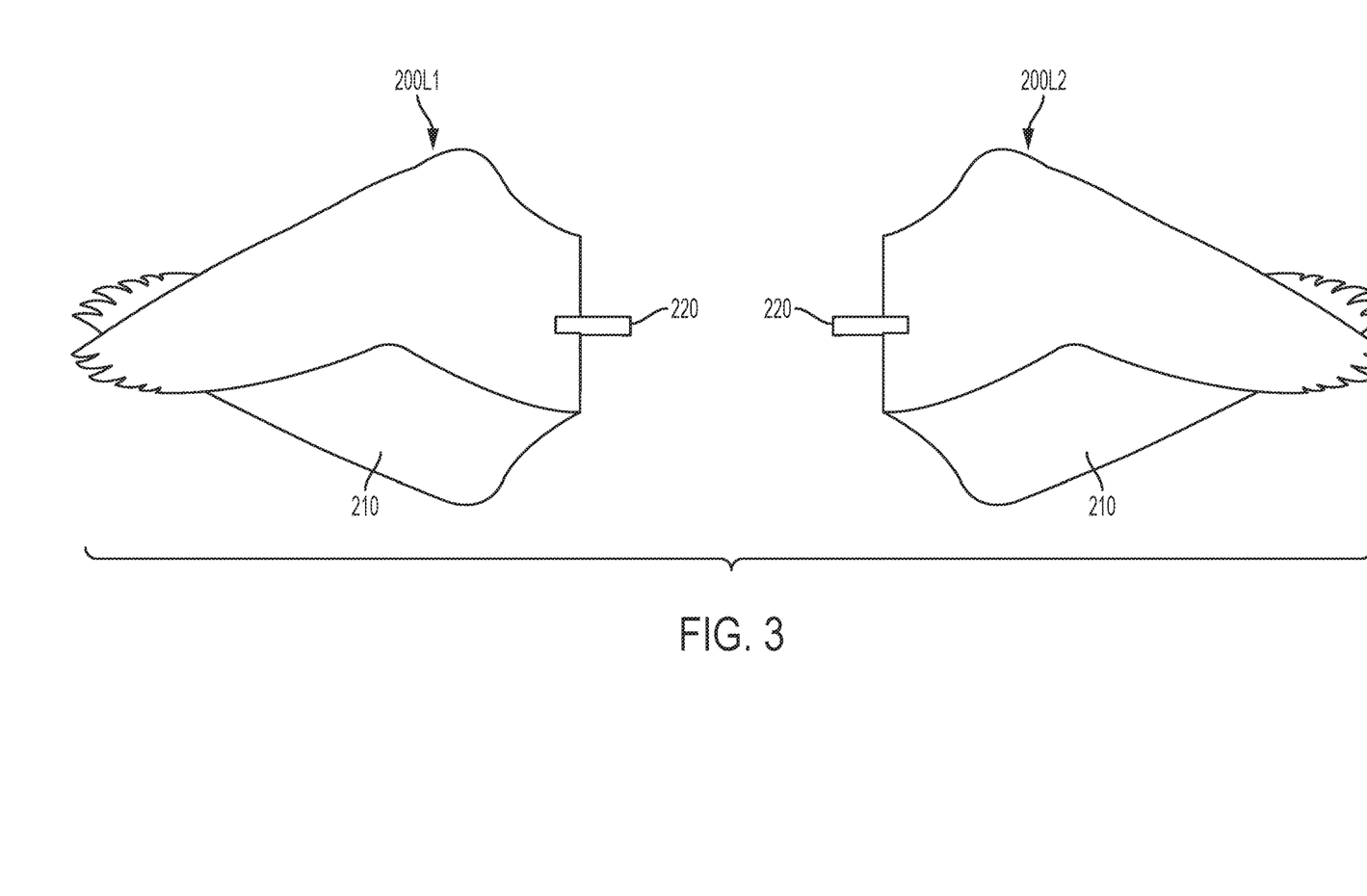
FIG. 3 shows a second (or bottom) side of left wing and right wing shown in FIG. 2.

FIG. 3 shows a second (or bottom) side 200L1, 200L2 of the wing 200 shown in FIG. 2. As seen in FIGS. 2 and 3, a first (e.g., top) side 200U1, 200U2 of the wings 200 may be configured to look like the top of a bird wing and the second (e.g., bottom) side 200L1, 200L2 may look like the bottom of a bird wing, respectively.

Referring to FIGS. 1-3, during operation, the wings 200 would look natural and realistic, accurately mimicking a real flapping wing. The wings 200 may be operated by the drive system 120 to rotate the wings 200, oscillate repeatedly back and forth, flap up and down, or oscillate repeatedly back and forth (or rotate 360°) and flap simultaneously.

During operation of the drive system 120, rather than rotate the wings 200 continuously 360 degrees, the wings 200 may be rotated partially and oscillated repeatedly back and forth up to, for example, about 180 degrees. This would provide a more realistic motion. Using wing design shown in, for example, FIGS. 2 and 3, the drive system 120 may be operated to vary the oscillation to show the white side 200L1, 200L2 and color side 200U1, 200U2 for long distance flash attraction, then change when the birds get closer to show only the color side 200U1, 200U2 to mimic what a bird would see when closer to the decoy 100.

It is noted that the wings 200 may be oscillated less than 180°, or more than 180°.

The drive system 120 may be operated to oscillate the wings 200 (or 300) between, for example, about 180 degrees and about 360 degrees, or rotate the wings continuously 360 degrees for long range flash, then rotate the wings so that the wings oscillate the top or colored side 200U1, 200U2 only to mimic what a bird would see when closer to the decoy 100. White side 200L1, 200L2 (shown in FIG. 3) may be implemented for flash and attraction and natural color 200U1, 200U2 (shown in FIG. 2) may be implemented for getting fowl close.

The drive system 120 may be operated to rotate the wings 200 (or 300) in combination with oscillating the wings to attract, then entice the bird into the needed range.

Referring back to FIG. 1, a decoy may be provided with the drive system 120, so as to provide a rotary wing decoy 100 that also flaps wings within a flap angle A, which may be 90 degrees.

Figure 4:
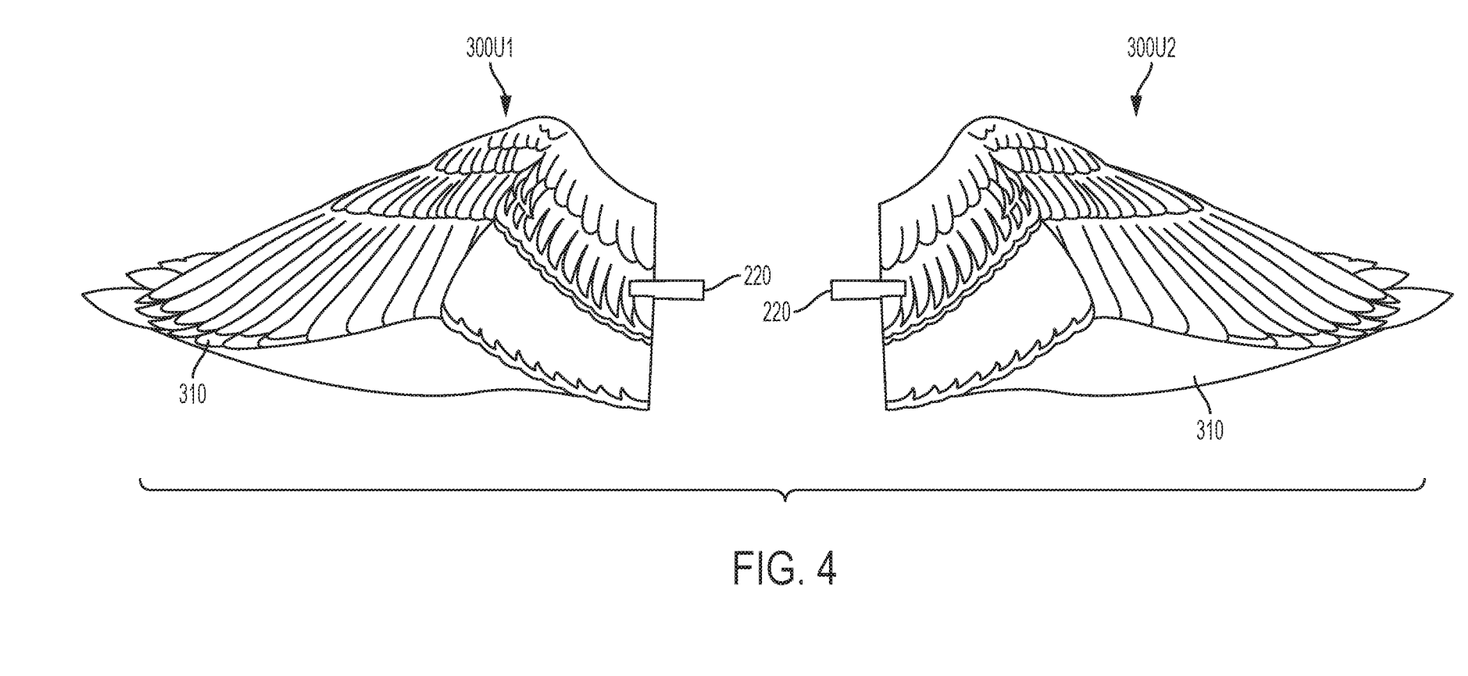
FIG. 4 shows a first (or top) side of another example of a left wing and a right wing, constructed according to the principles of the disclosure.
Figure 5:
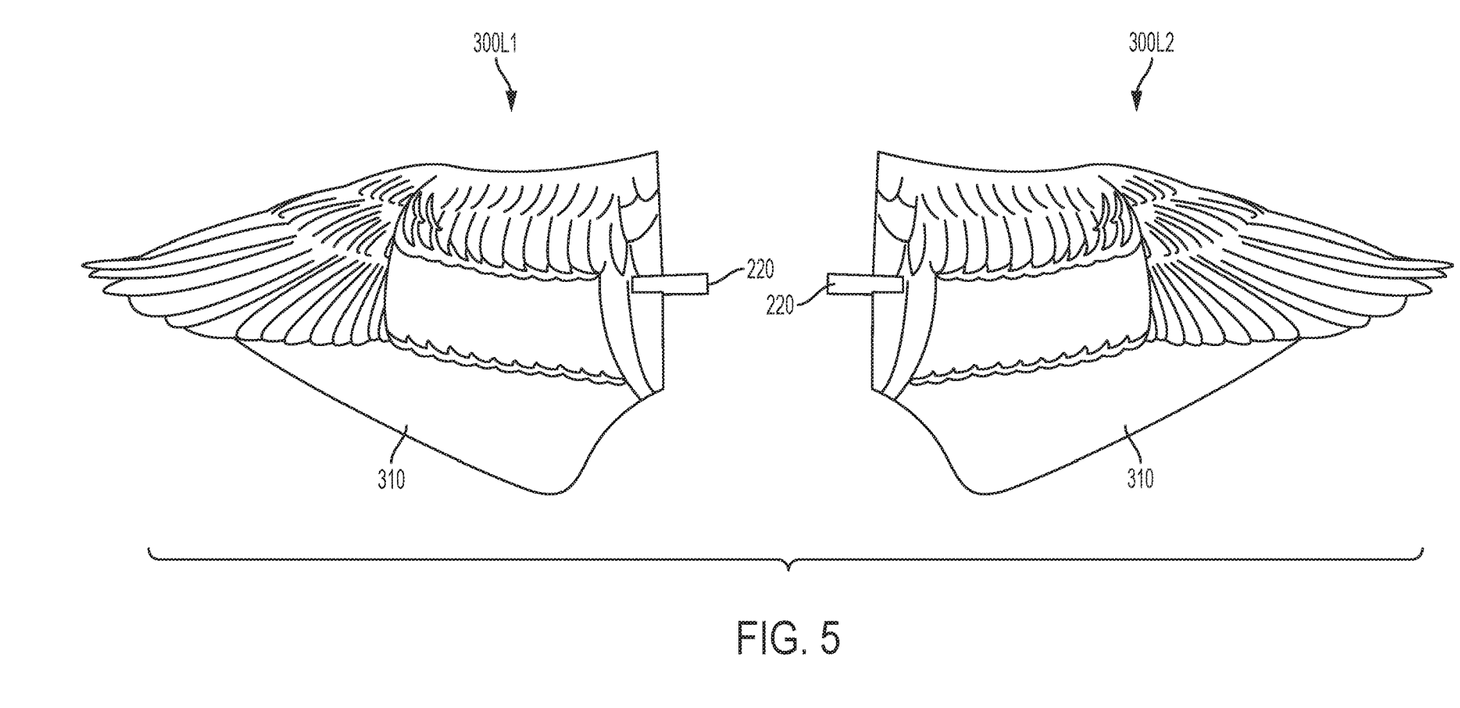
FIG. 5 shows a second (or bottom) side of the left wing and right wing shown in FIG. 4.

FIG. 4 shows a first (e.g., top) side 300U1, 300U2 of another example of a first (e.g., left) wing 300 and a second (e.g., right) wing 300, constructed according to the principles of the disclosure; and, FIG. 5 shows a second (e.g., bottom) side 300L1, 300L2 of the first (or left) wing 300 and second (or right) wing 300 shown in FIG. 4.

As seen in FIGS. 4 and 5, the wing 300 may have a realistic wing shape that may allow for balance when rotating, thereby providing the realism of an actual bird wing. The wing 300 may be painted to show the extended (e.g., shown in FIG. 5) and retracted (e.g., shown in FIG. 4) extremes of the bird's wings when landing. When rotated, the wings 300 may provide the realism of a "flapping" wing.

As seen in FIG. 4, wings 300 may be painted and patterned on the first side 300U1, 300U2 to mimic a retracted wing 300 with a brown upper portion, a blue middle portion, and a dark or black bottom portion, with white areas separating the blue middle portion from the brown upper portion and dark bottom portion, thereby providing optimal attraction for a predetermined bird, such as, for example, certain water-fowl.

The wings 300 may include shading on the first side 300U1, 300U2 and/or second side 300L1, 300L2, so as to provide a three-dimensional, realistic appearance that, when manipulated mimic actual wings.

Referring to FIG. 5, wings 300 may be painted and patterned on the second side 300L1, 300L2 to mimic an extended wing 300, having the same color schemes and patterns as the first side 300U1, 300U2, but patterned to mimic an extend wing, as opposed to the retracted wing pattern seen in FIG. 4.

The terms "including," "comprising" and variations thereof, as used in this disclosure, mean "including, but not limited to," unless expressly specified otherwise.

The terms "a," "an," and "the," as used in this disclosure, means "one or more," unless expressly specified otherwise.

Although process steps, method steps, or the like, may be described in a sequential order, such processes or methods may be configured to work in alternate orders. In other words, any sequence or order of steps that may be described does not necessarily indicate a requirement that the steps be performed in that order. The steps of the processes or methods described herein may be performed in any order practical. Further, some steps may be performed simultaneously.

When a single device or article is described herein, it will be readily apparent that more than one device or article may be used in place of a single device or article. Similarly, where more than one device or article is described herein, it will be readily apparent that a single device or article may be used in place of the more than one device or article. The functionality or the features of a device may be alternatively embodied by one or more other devices which are not explicitly described as having such functionality or features.

While the disclosure has been described in terms of exemplary embodiments, those skilled in the art will recognize that the disclosure can be practiced with modifications in the spirit and scope of the appended claims. These examples are merely illustrative and are not meant to be an exhaustive list of all possible designs, embodiments, applications, or modifications of the disclosure.

What is claimed is:

1. A bird decoy, comprising:
   a wing that is operable to create realistic movement; and
   a drive system connected to the wing,
   wherein the drive system is configured to select between oscillation, rotation and flapping, or a combination of simultaneously oscillating and flapping or rotating and flapping,
   wherein the drive system is further configured to receive at least one signal from at least one sensor to vary wing movement based on the at least one signal, and
   wherein the varying wing movement comprises varying the rate of oscillation, the rate of rotation, the rate of flapping, and varying the angle of oscillation, the angle of rotation and the angle of flapping.

2. The bird decoy of claim 1, wherein the drive system comprises:
   a motor shaft that connects to the wing.

3. The bird decoy of claim 2, wherein the drive system comprises:
   a motor that rotates or oscillates the motor shaft.

4. The bird decoy of claim 1, wherein the wing comprises:
   a wing body; and,
   a wing shaft.

5. The bird decoy of claim 4, wherein the wing body comprises:
   a shape that creates a realistic illusion of wing motion.

6. The bird decoy of claim 4, wherein the wing body comprises:
   a painted or formed surface having one or more colors, one or more patterns, or one or more shapes.

7. The bird decoy of claim 6, wherein the painted or formed surface mimics one of a retracted wing and an extended wing.

8. The bird decoy of claim 6, wherein the painted or formed surface mimics one of an upper wing surface of a bird or a bottom wing surface of a bird, the bottom wing surface of the bird comprising a color that is substantially lighter than the upper wing surface of the bird.

9. A bird decoy, comprising:
a wing that is operable to create realistic movement; and
a drive system connected to the wing and that operates the wing to select between oscillation, rotation and flapping, or a combination of simultaneously oscillating and flapping or rotating and flapping,
wherein the wing has a shape that creates a realistic illusion of wing motion during operation,
wherein the drive system is configured to receive at least one signal from at least one sensor to vary wing movement based on the at least one signal, and
wherein the varying wing movement comprises varying the rate of oscillation, the rate of rotation, the rate of flapping, and varying the angle of oscillation, the angle of rotation and the angle of flapping.

10. The bird decoy of claim 9, wherein the drive system comprises:
a motor shaft that connects to the wing.

11. The bird decoy of claim 10, wherein the drive system comprises:
a motor that rotates or oscillates the motor shaft.

12. The bird decoy of claim 9, wherein the wing comprises:
a wing body; and,
a wing shaft.

13. The bird decoy of claim 10, wherein the wing body comprises:
a painted or formed surface having one or more colors, one or more patterns, or one or more shapes.

14. The bird decoy of claim 13, wherein the painted or formed surface mimics one of a retracted wing and an extended wing.

15. The bird decoy of claim 13, wherein the painted or formed surface mimics one of an upper wing surface of a bird or a bottom wing surface of a bird, the bottom wing surface of the bird comprising a color that is substantially lighter than the upper wing surface of the bird.

16. A wing system for a decoy, the wing system comprising:
a wing that is operable to create realistic movement; and
a drive system connected to the wing and that operates the wing to select between oscillation, rotation and flapping, or a combination of simultaneously oscillating and flapping or rotating and flapping,
wherein the wing has a painted or formed surface having one or more colors, one or more patterns, or one or more shapes,
wherein the drive system is further configured to receive at least one signal from at least one sensor to vary wing movement based on the at least one signal, and
wherein the varying wing movement comprises varying the rate of oscillation, the rate of rotation, the rate of flapping, and varying the angle of oscillation, the angle of rotation and the angle of flapping.

17. The bird decoy of claim 16, wherein the drive system comprises:
a motor shaft that connects to the wing.

18. The bird decoy of claim 17, wherein the drive system comprises:
a motor that rotates or oscillates the motor shaft.

19. The bird decoy of claim 16, wherein the wing comprises:
a shape that creates a realistic illusion of wing motion.

20. The bird decoy of claim 16, wherein the painted or formed surface mimics at least one of:
(i) a retracted wing and an extended wing; and
(ii) one of an upper wing surface of a bird or a bottom wing surface of a bird, the bottom wing surface of the bird comprising a color that is substantially lighter than the upper wing surface of the bird.

* * * * *